(No Model.)
M. E. EWELL.
Dough Kneader.
No. 240,015.　　　　　　　Patented April 12, 1881.
Fig. 1.
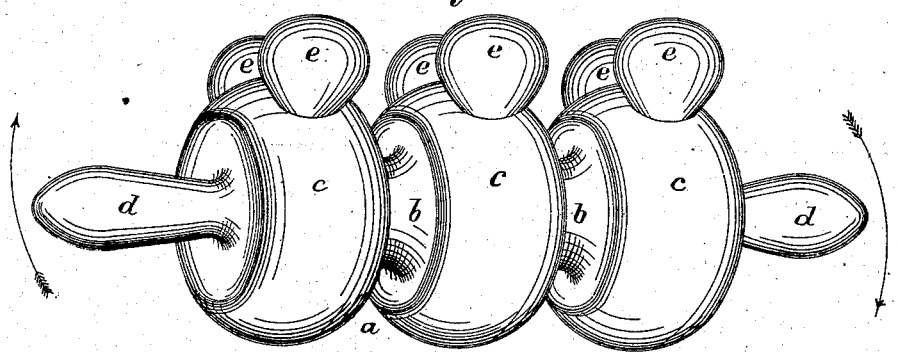
Fig. 2.
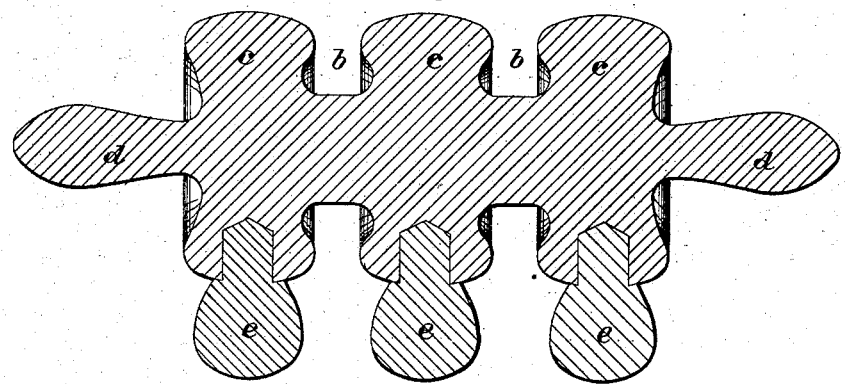
Fig. 3.　　　　　　　　Fig. 4.
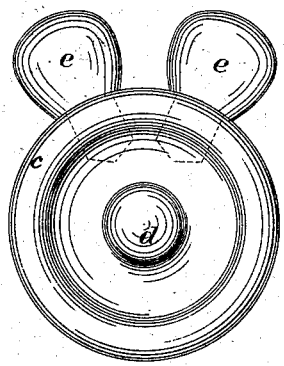　　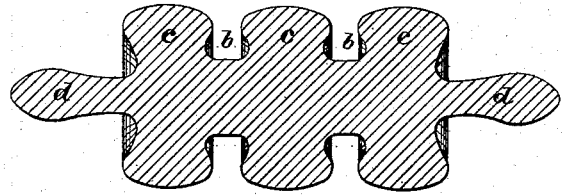
Fig. 5.
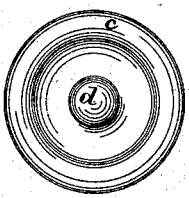
Attest:
Herm. Lauten.
Geo. M. Finckel
Inventor:
Mildred E. Ewell,
by her attorney,
Wm. H. Finckel

UNITED STATES PATENT OFFICE.

MILDRED E. EWELL, OF WINCHESTER, VIRGINIA.

DOUGH-KNEADER.

SPECIFICATION forming part of Letters Patent No. 240,015, dated April 12, 1881.

Application filed February 14, 1881. (No model.)

*To all whom it may concern:*

Be it known that I, MILDRED E. EWELL, a citizen of the United States, residing at Winchester, in the county of Frederick and State of Virginia, have invented certain new and useful Improvements in Dough-Kneaders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is in the nature of a dough-kneading implement for domestic use; and I may here remark that I am aware that I am not the first to invent a device for this purpose. Such prior similar devices have been made with fluted or corrugated peripheries, the working projections or flanges of which have been curvilinear, but short, narrow, and of quick curvature, or else provided with many angles difficult to clean, and hence liable to sour the device from the clinging thereto of decomposing particles of dough.

In my invention, as in others, the object to be attained is the provision of mechanism that will simulate the action of the knuckles, fingers, and joints of the hands in kneading dough.

My invention therefore consists in a roller-like implement provided with handles at its ends, like an ordinary rolling-pin, the periphery being divided by a number of deep annular undercut grooves forming spreading annular projections, which, when semi-rotated back and forth over a mass of dough, owing to their peculiar shape and depth, will greatly lighten the labor of kneading and quicken that operation. I prefer to add to these projections a number of radial or tangential knobs, preferably of ovate shape, which are useful in breaking up the dough or gathering and kneading it together when disintegrated.

In the accompanying drawings, in the several figures of which like parts are similarly designated, Figure 1 is a perspective view of my improved kneader; Fig. 2, a longitudinal central section; Fig. 3, an end view; and Fig. 4, a side elevation of a modification, and Fig. 5 an end view of the latter, both on a reduced s a e.

I prefer to turn my kneader from suitable wood; but it may be made of glass, or other vitreous or equivalent material, cast, molded, or otherwise formed; and I construct it with a cylindrical body, $a$, with a number of annular undercut grooves, $b$, of very considerable depth, which divide the body into vertical projecting rims, disks, or flanges $c$, whose peripheries are curved, and by virtue of the undercut character of the grooves are broader or more extended than their bases, so as to obtain a number of extended broad working-surfaces of considerable length, that enter deep into and act quickly upon a large surface of dough. Handles $d$ are provided at the ends of the body, similar to a rolling-pin, and by means of these handles a semi-rotary or rolling motion back and forth over the dough may be given; or in some instances the device may have a sort of vibratory back-and-forth motion, as upon a central vertical pivot, as indicated by the arrows in Fig. 1. This latter motion will be effectual in breaking up a mass of dough.

To further increase the efficiency of the implement, I provide, say, two series of ovate knobs, $e$, projecting radially or tangentially from the peripheries of the projections $c$, and these knobs, by their arrangement and shape, will be found very useful in breaking up or gathering together and perfectly kneading a mass of dough. Their position when not in use is indicated in Fig. 1, and when in use in Figs. 2 and 3.

The formation of the grooves and projections on my kneader is such as to admit of easy, perfect, and thorough cleaning thereof.

I am aware that a kneading-machine has heretofore been devised in which a many-sided roll has been provided with protuberances. I do not broadly claim this, nor a kneading-roller having shallow grooves, flutes, or corrugations, as my invention; but

What I claim is—

1. The dough-kneading implement herein described, composed of a cylindrical body, $a$, provided with undercut annular deep grooves $b$, broad-surfaced intervening kneading-projections $c$, and handles $d$, as shown.

2. The body $a$, provided with undercut annular grooves $b$, forming the broad-surfaced kneading-projections $c$, the handles $d$, and the ovate knobs $e$, arranged upon the said projections, all constructed as shown, and for the purpose described.

In testimony whereof I affix my signature in presence of two witnesses.

MILDRED E. EWELL.

Witnesses:
  JNO. W. RICE,
  J. FEN BROWN.